Feb. 1, 1966
G. J. CROWDES
3,233,032
GAS PRESSURIZED ELECTRIC CABLE
Filed Aug. 15, 1962
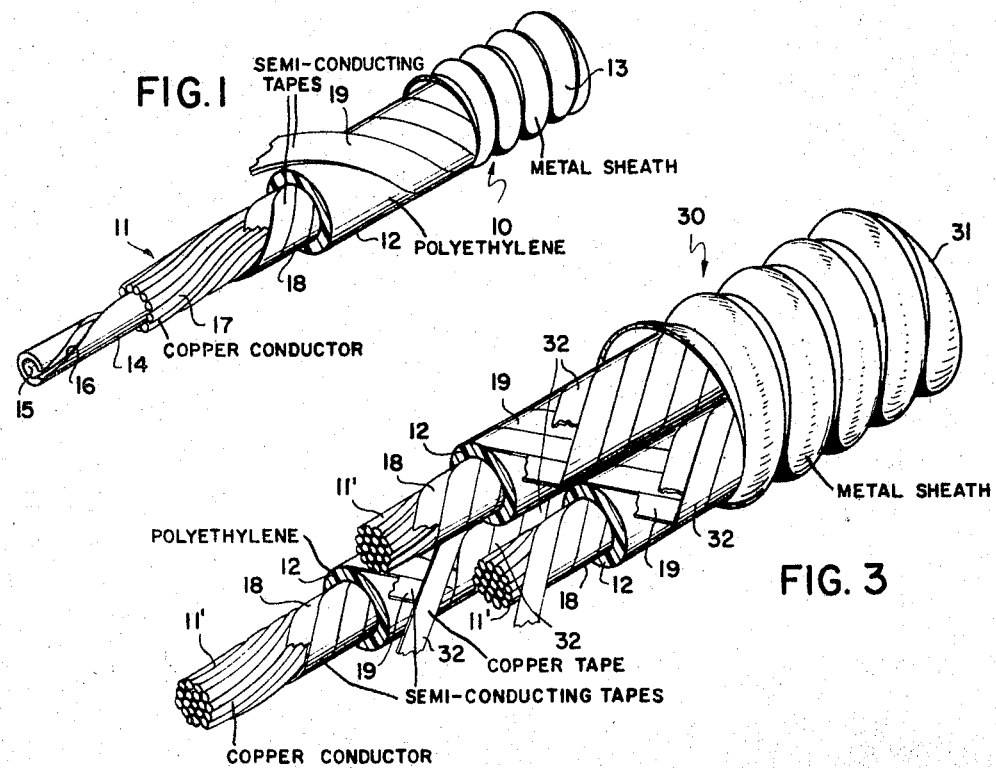
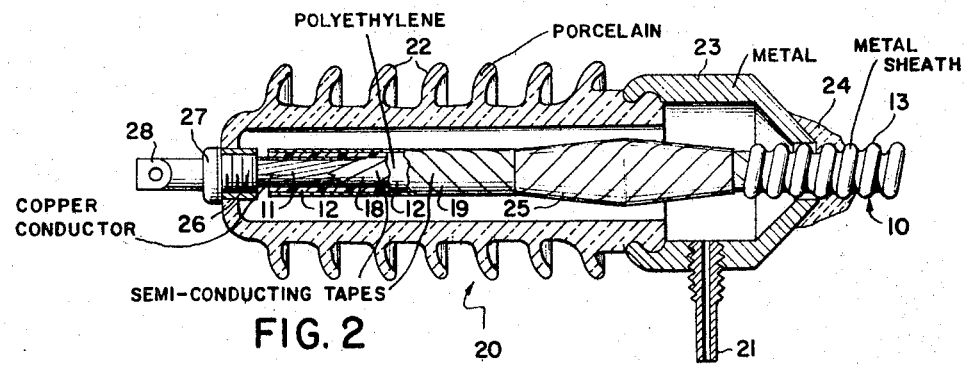
INVENTOR.
GEORGE J. CROWDES
BY
Adams, Forward and McLean
ATTORNEYS 3,233,032
GAS PRESSURIZED ELECTRIC CABLE
George J. Crowdes, Needham Heights, Mass., assignor to Simplex Wire and Cable Company, Cambridge, Mass., a corporation of Massachusetts
Filed Aug. 15, 1962, Ser. No. 217,075
2 Claims. (Cl. 174—24)

My invention relates to the transmission and distribution of electric energy and in particular provides an improved high voltage electric cable construction similar to the gas filled types but utilizing a solid, homogeneous, thermoplastic insulant rather than the conventional impregnated paper insulant.

The advent of thermoplastic materials, such as polyvinyl chlorides and polyethylenes, and particularly the latter because of its exceptional dielectric properties and resistance to moisture penetration, has produced a new class of electric cables insulated with such thermoplastics and which has found wide-spread use, particularly for communication and control purposes. Because, however, of the relatively low corona extinction levels of even the polyethylene insulated cables, the use of thermoplastic insulated cables in high voltage applications, for example, in the transmission and distribution of electric energy, has been limited. Generally, commercial polyethylene insulated cables are available at ratings up to 15 k.v. as a maximum, although there are presently known techniques which might extend this maximum somewhat.

In designing polyethylene insulated cable for high voltage applications, it has heretofore been found that the employment of a thin layer of semi-conducting material at the interface between polyethylene insulation and a conductor or sheath greatly improves the coroner extinction level at the polyethylene surface at such interface. Using such techniques it is possible to design cables insulated with polyethylene compositions exhibiting corona extinction levels as high as 69 k.v.

I have found that by resorting to gas pressure techniques, however, not for the conventional purpose of preventing ionization of gas trapped in voids by holding pressure of an insulant such as impregnated paper, but to compress a semi-conducting layer tightly against each surface of the polyethylene insulant, increases the corona extinction levels which can be achieved. To this end, however, the semi-conducting layer must be formed of a coherent, yieldable material, that is, a material which is plastic or elastic and will yield under the application of mechanical stress in the sense of being capable of being deformed continuously in any direction without rupture. For my purpose, it is immaterial whether the material is plastic in the sense that the deformation is permanent or elastic in the sense that the material will reform to its original shape upon removal of the stress.

Thus, in accordance with the primary object of my invention I provide a conductor insulated with a solid, homogeneous, thermoplastic insulant, such as polyethylene, in which there is provided between conductor and insulant a layer of coherent, yieldable semi-conducting material. A second layer of coherent, yieldable semi-conducting material is provided adjacent the exterior of the insulant. A sheath is provided enclosing the conductor, insulant and semi-conducting layers. An outer passageway within the sheath is provided along the length of the cable in communication with the exterior surface of the outer layer of semi-conducting material along the length of the cable. Similarly an inner passageway is provided along the length of the cable interiorly of the inner layer of semi-conducting material and in lateral communication with the inner surface of such layer along the length of the cable. The cable is completed by connecting in a conventional manner a source of pressurized, inert gas both to the inner passageway and outer passageway utilizing the techniques employed in pressuring a gas filled camble.

For a more complete understanding of the practical application of my invention, reference is made to the appended drawings in which:

FIGURE 1 is a partially sectional, fragmentary isomeric view of an electric cable conducted in accordance with my invention;

FIGURE 2 is an elevation of a portion of a cable, such as that shown in FIGURE 1, illustrating suitable gas pressuring equipment; and FIGURE 3 is a view similar to FIGURE 1 of another electric cable constructed in accordance with my invention.

Referring to FIGURE 1, the reference numeral 10 designates an electric cable including a central elongated conductor 11 about which a tube 12 of polyethylene insulation is extruded and which with its insulation 12 is enclosed in a spirally corrugated copper sheath 13.

Conductor 11 is formed of a copper tube 14 the hollow center 15 of which is laterally communicated with the outside of tube 14 by means of a slot 16 through the wall of tube 14 which extends helically along the length of tube 14. Conductor 11 also includes a layer of copper wire strands 17 helically served about tube 14. A layer 18 coherent, yieldably semi-conducting material, for example, in the form of a thin, extruded covering of polyethylene or a butyl rubber tape in which the polyethylene or butyl rubber is compounded with a substantial proportion of carbon black, applied about and enclosing conductor 11, for example, by helically serving the butyl rubber tape with ¼ inch overlap tightly over conductor 11. Polyethylene containing anti-oxidants and other additives is applied, for example by extrusion, over semi-conducting layer 18 to form insulation 12. About insulation 12 there is applied a second layer 19 of yieldable, coherent semi-conducting material, again typically polyethylene or butyl rubber tape compounded with carbon black or other conventional conducting material in a proportion to provide a resistivity on the order of 100 ohms centimeter. Thereafter the assembly is enclosed in sheath 13 which is typically formed by folding a flat strip of copper or other metal about the conductor and insulation into a tube with a longitudinal seam, welding the seam and thereafter corrugating the welded tube over the assembly of conductor and insulation. In forming the corrugation the trough should bear against semi-conducting layer 19 such that the helical corrugation of sheath 13 forms a helical passage communicating above the length of cable 10 with the exterior surface of layer 19.

In order to provide communication to the passageway formed between layer 19 and sheath 13 and to the passageway formed in the void spaces in conductor 11 including the center 15 of tube 14 and those between strands 17, as is more clearly shown in FIGURE 2, at least one end of each section of insulated cable 10 should be terminated in a pothead 20.

Pothead 20 does not differ functionally from the typical potheads employed with paper insulated, lead sheathed cable and fundamentally includes a hollow porcelain bushing 22 which at one end is terminated with a metal wiping sleeve 23 through which cable 10 enters pothead 20 at the end of sleeve 23 remote from porcelain bushing 22. The cable entrance into sleeve 23 is closed and sealed with a wiped joint, indicated by the reference numeral 24, and cable 10 is extended through the open center of bushing 22.

Sheath 13 is terminated within wiping sleeve 23 and a stress relief cone is built up of varnished cambric tape, as indicated by the reference numeral 25, over that portion of insulation 12 adjacent the end of shield 13. Closely adjacent the end of bushing 22 remote from wiping sleeve 23 insulation 12 on cable 10 is terminated, and conductor 11, which is exposed for a short length, is terminated in a cable socket 26 which extends through the end of bushing 22 remote from sleeve 23 and is secured in such position by a cap nut 27 having a terminal lug 28. Socket 26 is suitably gasketed to provide a gas tight seal where it extends through bushing 22 such that the interior of pothead 20 can be pressured or evacuated without leakage to or from the exterior. Communication with the interior of pothead 20 is provided by a conduit 21 which is threadedly engaged in an aperture in the side of wiping sleeve 23.

It will be noted that the construction differs from conventional impregnated paper filled cable terminations in that stress relief cone 25 does not cover the end of sheath 13, which is exposed in pothead 20.

In operation cable 10, referring more particularly to FIGURE 2, is applied to pothead 20 as described with reference to FIGURE 2 and conduit 21 is evacuated to 450 microns. Thereafter conduit 21 is connected to nitrogen pressure source to admit nitrogen gas through conduit 21 into the open center 15 of tube 14 and between strands 17 and into the spiral passageway under the corrugation of sheath 13, the pressure being regulated to 40 p.s.i.g. In a typical case cable 10 will have a central conductor 11 with a copper area equivalent to No. 2 AWG wire, semi-conducting layer 18 will have a wall thickness of 0.0375 inch, polyethylene layer 12 will have a wall thickness of 0.220 inch, semi-conducting layer 19 will have a wall thickness of 0.020 inch and sheath 13 will have a wall thickness of 0.012 inch. The open space in conductor 11 extending throughout its length has a cross-sectional area of about 43,300 square mils along the tubular center and of 14,700 square mils while the area of the spiral passageway beneath sheath 13 outside of semiconducting layer 19 has an area of about 19,800 square mils measured perpendicularly to its pitch. Such a cable, if not pressurized in accordance with my invention, would normally be rated at 15 k.v. at 3 phase grounded neutral operation, but when so pressurized it can be operated without failure at 45 k.v.

FIGURE 3 illustrates a three conductor cable 30. Each conductor is designated by the reference numeral 11', as it is identical to conductor 11 utilized in cable 10 except in this case the conductors are composed entirely of strands. Similarly, each conductor 11' has applied about it, as before, a thin layer 18 of coherent, yieldable semi-conducting material over which a layer of solid polyethylene insulation 12 is extruded. Each conductor 11' further has applied about its polyethylene insulation 12 a second thin layer 19 of coherent, yieldable semi-conducting material. Each of the insulated conductors 11' in cable 30 has applied over its outer layer 19 of semi-conducting material a thin copper shield 32 which typically is applied in the form of helically served tape. The three conductors 11' thus insulated and shielded are cabled together and enclosed in a fluid tight corrugated copper sheath 31 which is formed in much the same manner as sheath 13 with the exception that it contains three insulated conductors 11' rather than one.

The cable identified as cable 30 in FIGURE 3 is employed similary to cable 10, the open centers of each of conductors 11' being pressured while the space between the conductors and their enclosing sheath 31 is also pressured, typically with an inert gas such as nitrogen.

I claim:

1. In a gas pressurized electric cable including an elongated conductor having a layer of solid homogenous insulation enclosing said conductor and a sheath enclosing said insulation, the improvement which includes an inner layer of coherent yieldable semi-conducting material in intimate contact with said insulation interposed between said conductor and said insulation, an outer layer of coherent yieldable semi-conducting material in intimate contact with said insulation interposed between said conductor and said sheath, an inner passageway along the length of said cable within said inner layer of semi-conducting material in lateral communication therewith, and an outer passageway along the length of said cable without said outer layer of semi-conducting material and in lateral communication therewith said inner and outer passageways each containing a gas under pressure.

2. The improvement according to claim 1 in which further includes means connected to said inner passageway for supplying gas thereto, and means connected to said outer passageway for supplying gas thereto.

References Cited by the Examiner

UNITED STATES PATENTS

| | | | |
|---|---|---|---|
| 2,531,156 | 11/1950 | Piercy et al. | 174—25 |
| 2,597,222 | 5/1952 | Bennett | 174—25 |

FOREIGN PATENTS

| | | |
|---|---|---|
| 404,519 | 1/1934 | Great Britain. |
| 513,377 | 10/1939 | Great Britain. |
| 553,716 | 6/1943 | Great Britain. |

JOHN F. BURNS, *Primary Examiner.*

JOHN P. WILDMAN, E. JAMES SAX, *Examiners.*

UNITED STATES PATENT OFFICE
CERTIFICATE OF CORRECTION

Patent No. 3,233,032                        February 1, 1966

George J. Crowdes

It is hereby certified that error appears in the above numbered patent requiring correction and that the said Letters Patent should read as corrected below.

Column 1, line 35, for "coroner" read -- corona --; line 43, for "of" read -- on --; column 2, line 4, for "camble" read -- cable --; line 8, for "sectional" read -- sectioned --; line 32, after "black," insert -- is --; same column 2, line 52, for "above" read -- along --.

Signed and sealed this 17th day of January 1967.

(SEAL)
Attest:

ERNEST W. SWIDER
Attesting Officer

EDWARD J. BRENNER
Commissioner of Patents